(12) United States Patent
Liu et al.

(10) Patent No.: US 9,979,572 B2
(45) Date of Patent: May 22, 2018

(54) CHANNEL EQUALIZATION AND TRACKING APPARATUS AND METHOD AND RECEIVER

(71) Applicants: FUJITSU LIMITED, Kawasaki-shi, Kanagawa (JP); SOCIONEXT INC., Yokohama-shi, Kanagawa (JP)

(72) Inventors: Bo Liu, Beijing (CN); Weizhen Yan, Beijing (CN); Lei Li, Beijing (CN); Hao Chen, Beijing (CN); Andrzej Radecki, Maidenhead (GB)

(73) Assignees: FUJITSU LIMITED, Kawasaki (JP); SOCIONEXT INC., Yokohama (JP)

( * ) Notice: Subject to any disclaimer, the term of this patent is extended or adjusted under 35 U.S.C. 154(b) by 0 days. days.

(21) Appl. No.: 15/332,464

(22) Filed: Oct. 24, 2016

(65) Prior Publication Data

US 2017/0041167 A1    Feb. 9, 2017

Related U.S. Application Data

(63) Continuation of application No. PCT/CN2015/073600, filed on Mar. 4, 2015.

(30) Foreign Application Priority Data

Apr. 24, 2014   (CN) .......................... 2014 1 0168369

(51) Int. Cl.
*H03H 7/30* (2006.01)
*H04L 27/01* (2006.01)
(Continued)

(52) U.S. Cl.
CPC ........ *H04L 27/01* (2013.01); *H04L 25/03159* (2013.01); *H04L 27/06* (2013.01);
(Continued)

(58) Field of Classification Search
CPC ......... H04L 25/03057; H04L 25/03038; H04L 25/0885; H04L 27/2636; H04L 27/0006; H04B 10/0795; H04B 10/07953
(Continued)

(56) References Cited

U.S. PATENT DOCUMENTS 7,702,024 B2    4/2010   Kim et al.
8,243,834 B2    8/2012   Kishigami et al.
(Continued)

FOREIGN PATENT DOCUMENTS

CN    101404633    4/2009
CN    101404641    4/2009
(Continued)

OTHER PUBLICATIONS

International Search Report dated May 29, 2015 in corresponding International Application No. PCT/CN2015/073600.
(Continued)

*Primary Examiner* — Khai Tran
(74) *Attorney, Agent, or Firm* — Staas & Halsey LLP

(57) ABSTRACT

A channel equalization and tracking apparatus and method and a receiver. The apparatus includes: a Fourier transforming unit configured to transform a received time-domain signal into a frequency-domain signal; a compensating and equalizing unit configured to perform phase compensation and frequency-domain equalization on the signal outputted by the Fourier transforming unit by using one time of multiplication according to time delay information and an equalizer coefficient; a deciding unit configured to decide the equalized signal; and a channel tracking unit configured to track a channel according to the signal outputted by the Fourier transforming unit and an error signal obtained by the deciding unit. With embodiments of the present disclosure, not only complexity and hardware demands of the whole
(Continued)

system are lowered, but also performance of the system is not affected.

9 Claims, 6 Drawing Sheets

(51) Int. Cl.
    *H04L 27/06*     (2006.01)
    *H04L 25/03*     (2006.01)
    *H04L 27/26*     (2006.01)

(52) U.S. Cl.
    CPC ...... *H04L 27/2647* (2013.01); *H04L 27/2657* (2013.01); *H04L 25/03273* (2013.01); *H04L 27/265* (2013.01); *H04L 27/2672* (2013.01)

(58) Field of Classification Search
    USPC .................. 375/229, 230, 232; 708/322, 333
    See application file for complete search history.

(56) References Cited

U.S. PATENT DOCUMENTS

| | | | |
|---|---|---|---|
| 8,428,190 | B2 | 4/2013 | Yamagishi |
| 9,673,881 | B2 | 6/2017 | Tomeba et al. |
| 9,686,108 | B2 * | 6/2017 | Zhao ................... H04L 27/0006 |
| 2004/0109508 | A1 * | 6/2004 | Jeon ..................... H04L 27/2657 375/260 |
| 2010/0239033 | A1 | 9/2010 | Shiue et al. |

FOREIGN PATENT DOCUMENTS

| | | |
|---|---|---|
| JP | 2007-028636 | 2/2007 |
| JP | 2007-208967 | 8/2007 |
| JP | 2010-220105 | 9/2010 |
| KR | 1997-0060052 | 8/1997 |
| WO | WO 00/57609 | 9/2000 |
| WO | 2014/057840 | 4/2014 |

OTHER PUBLICATIONS

Extended European Search Report dated Nov. 7, 2017 in corresponding European Patent Application No. 15783893.9, 9 pages.
Japanese Office Action dated Dec. 5, 2017 in corresponding Japanese Patent Application No. 2016-563784, 6 pages.

* cited by examiner

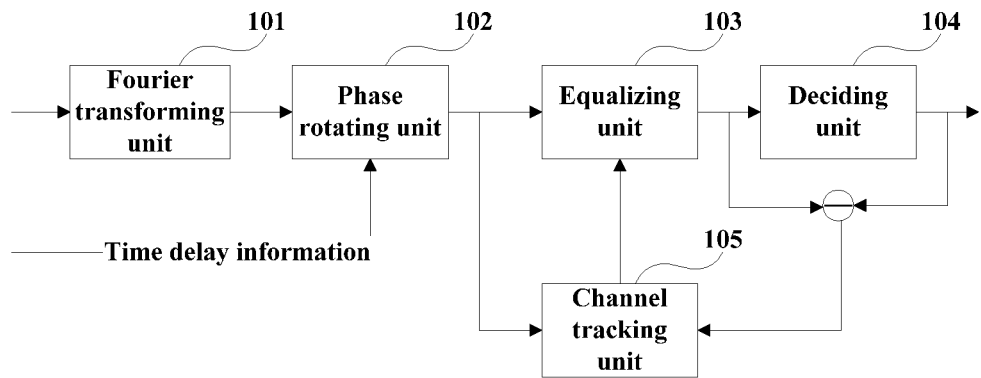
FIG. 1(--Prior Art--)
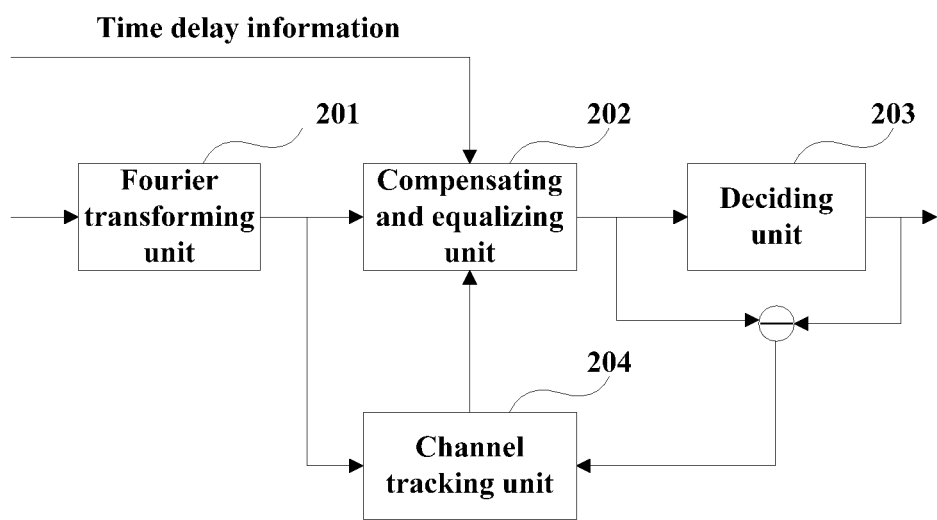
FIG. 2

CHANNEL EQUALIZATION AND TRACKING APPARATUS AND METHOD AND RECEIVER

CROSS-REFERENCE TO RELATED APPLICATIONS

This application is a continuation application, filed under 35 U.S.C. § 111(a), of International Application PCT/CN2015/073600 filed on Mar. 4, 2015 and claims foreign priority to Chinese Patent Application No. 201410168363, filed Apr. 24, 2014, the content of which is incorporated herein by reference in its entirety.

BACKGROUND

1. Field

The present disclosure relates to the field of communications technology, and in particular to a channel equalization and tracking apparatus and method and a receiver.

2. Description of the Related Art

In a general digital communications system, as clock frequencies of a transmitter end and a receiver end are hard to be accurately matched, a certain sampling frequency error exits between a signal sampled at the receiver end and a signal at the transmitter end, which is embodied as a phase offset of the received signal in a frequency domain, and phase rotation needs to be performed before equalization.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the disclosure.

However, it was found by the inventors that in an existing channel equalization and tracking system, equalization and phase rotation in the frequency domain are likewise expressed as complex multiplication, and in order to carry out clock recovery and channel tracking functions in a case of multicarrier, a phase rotation operation needs to be performed on each subcarrier, thereby bringing extra hardware complexity and power costs.

Embodiments of the present disclosure provide a channel equalization and tracking apparatus and method and a receiver, which lower complexity and hardware demands of the whole system, without affecting performance of the system.

According to a first aspect of the embodiments of the present disclosure, there is provided a channel equalization and tracking apparatus, including:

a Fourier transforming unit configured to transform a received time-domain signal into a frequency-domain signal;

a compensating and equalizing unit configured to perform phase compensation and frequency-domain equalization on the signal outputted by the Fourier transforming unit by using one time of multiplication according to time delay information and an equalizer coefficient;

a deciding unit configured to decide the equalized signal; and a channel tracking unit configured to track a channel according to the signal outputted by the Fourier transforming unit and an error signal obtained by the deciding unit.

According to a second aspect of the embodiments of the present disclosure, there is provided a channel equalization and tracking method, including:

transforming a received time-domain signal into a frequency-domain signal by using Fourier transform;

performing phase compensation and frequency-domain equalization on the Fourier transformed signal by using one time of multiplication according to time delay information and an equalizer coefficient;

deciding the equalized signal; and tracking a channel according to the Fourier transformed signal and an error signal obtained by the deciding.

According to a third aspect of the embodiments of the present disclosure, there is provided a receiver, including the channel equalization and tracking apparatus as described above.

An advantage of the embodiments of the present disclosure exists in that by using one time of multiplication to perform phase compensation and frequency-domain equalization on the Fourier transformed signal and tracking a channel by using an error signal obtained by the deciding and a signal without being phase rotated, not only complexity and hardware demands of the whole system are lowered, but also performance of the system is not affected.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

These and/or other aspects and advantages will become apparent and more readily appreciated from the following description of the embodiments, taken in conjunction with the accompanying drawings of which:

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size.

Elements and features depicted in one drawing or embodiment of the disclosure may be combined with elements and features depicted in one or more additional drawings or FIG. 1 is a schematic diagram of a structure of a channel equalization and tracking apparatus in a related technology;

FIG. 2 is a schematic diagram of a structure of the channel equalization and tracking apparatus of Embodiment 1 of the present disclosure;

DETAILED DESCRIPTION

Figure 3:
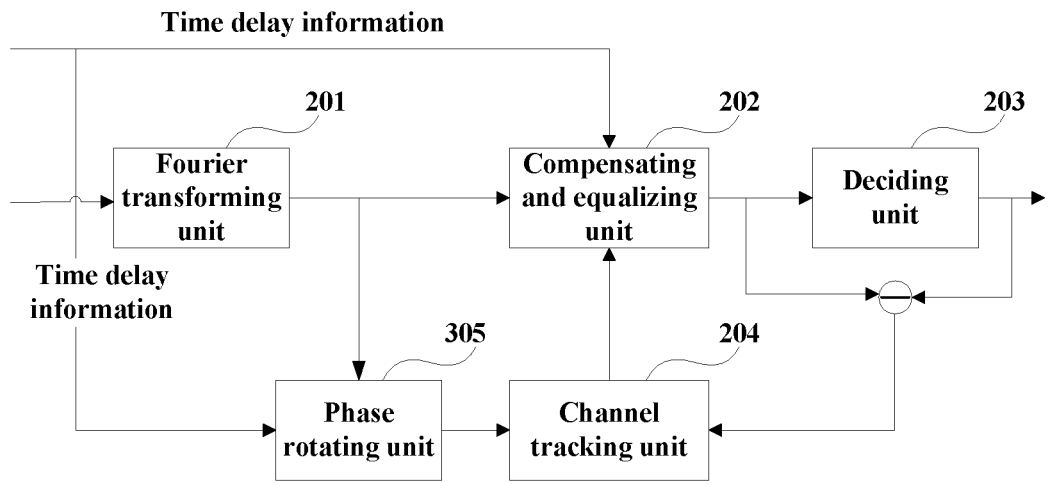
FIG. 3 is another schematic diagram of a structure of the channel equalization and tracking apparatus of Embodiment 1 of the present disclosure.

Reference will now be made in detail to the embodiments, examples of which are illustrated in the accompanying drawings, wherein like reference numerals refer to the like elements throughout. The embodiments are described below to explain the embodiments by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

FIG. 1 is a schematic diagram of a structure of a channel equalization and tracking apparatus in a related technology. As shown in FIG. 1, a Fourier transforming (such as fast Fourier transformation, FFT) unit 101 is configured to transform a received time-domain signal into a frequency-domain signal; a phase rotating unit 102 is configured to correct a residual phase error after being processed by the Fourier transforming unit 101 according to time delay information obtained from clock recovery; an equalizing unit 103 is configured to perform frequency-domain equalization on the phase rotated signal according to an equalizer coefficient; a deciding unit 104 is configured to decide the equalized signal and convert it into a value corresponding to a constellation point; and a channel tracking unit 105 is configured to track a channel according to an error signal obtained according to a result of decision of the deciding unit 104 and the signal rotated by the phase rotating unit 102, and output a new equalizer coefficient.

In a case of single channel, the channel equalization and tracking apparatus shown in FIG. 1 may better complete the clock recovery and channel tracking functions. However, in a case of multicarrier, the phase rotating unit 102 needs to perform a phase rotation operation on each subcarrier, which needs a large amount of operations, and greatly increases hardware demands and power consumption. Regarding the above technical problems, the present disclosure shall be described below in detail.

Embodiment 1

An embodiment of the present disclosure provides a channel equalization and tracking apparatus. FIG. 2 is a schematic diagram of a structure of the channel equalization and tracking apparatus of the embodiment of the present disclosure. As shown in FIG. 2, the channel equalization and tracking apparatus 200 includes a Fourier transforming unit 201, a compensating and equalizing unit 202, a deciding unit 203 and a channel tracking unit 204;

the Fourier transforming unit 201 is configured to transform a received time-domain signal into a frequency-domain signal, the compensating and equalizing unit 202 is configured to perform phase compensation and frequency-domain equalization on the signal outputted by the Fourier transforming unit 201 by using one time of multiplication according to time delay information and an equalizer coefficient, the deciding unit 203 is configured to decide the equalized signal, and the channel tracking unit 204 is configured to track a channel according to the signal outputted by the Fourier transforming unit 201 and an error signal obtained by the deciding unit 203.

In this embodiment, different from the structure shown in FIG. 1, the compensating and equalizing unit 202 shown in FIG. 2 does not calculate the phase offset, but uses one time of multiplication to perform phase compensation and frequency-domain equalization on the signal outputted by the Fourier transforming unit 201 according to time delay information and an equalizer coefficient. And furthermore, a signal inputted into the channel tracking unit 204 is not subjected to phase rotation, and the channel tracking unit 204 tracks a channel according to the signal outputted by the Fourier transforming unit 201 and an error signal obtained by the deciding unit 203.

Hence, it may be realized by using one time of multiplication by combining a coefficient of the phase rotation and the channel equalizer coefficient into one, without needing to respectively use complex multiplication for frequency-domain equalization and phase rotation, thereby efficiently lowering complexity and hardware demands of the whole system.

In this embodiment, the compensating and equalizing unit 202 may carry out the phase compensation and frequency-domain equalization by means of table lookup. For example, a two-dimensional table may be looked up according to the time delay information and the tracked equalizer coefficient, so as to obtain a corrected equalizer coefficient. However, the present disclosure is not limited thereto, and the phase compensation and frequency-domain equalization may be performed by one time of multiplication according to an actual situation.

In this embodiment, a speed of tracking a high-frequency sub-channel is relatively slow. In a scenario where attenuation is relatively severe at a high frequency of a channel, influence of such an effect on performance of the system is not obvious. Hence, even though the signal inputted into the channel tracking unit 204 is a signal not subjected to phase rotation, the influence on the performance of the system is not large.

In order to further improve the performance of the system, phase selection may be performed on one or more designated subcarriers in the multicarrier system, so as to carry out tracking on designated sub-channels.

FIG. 3 is another schematic diagram of a structure of the channel equalization and tracking apparatus of the embodiment of the present disclosure. As shown in FIG. 3, the channel equalization and tracking apparatus 300 includes a Fourier transforming unit 201, a compensating and equalizing unit 202, a deciding unit 203 and a channel tracking unit 204, as described above.

As shown in FIG. 3, the channel equalization and tracking apparatus 300 further includes a phase rotating unit 305 configured to calculate phase error(s) of one or more subcarriers according to the time delay information and the signal outputted by the Fourier transforming unit 201 so as to obtain a phase offset of a designated sub-channel, and perform phase rotation on the designated sub-channel according to the phase offset; and the channel tracking unit 204 is further configured to track the channel according to the signal outputted by the phase rotating unit 305 and the error signal obtained by the deciding unit 203.

In this embodiment, the phase rotating unit 305 does not calculate phase errors of all subcarriers, but only calculates phase error(s) of part (one or more) of the subcarriers, so as to obtain the phase offset of the designated sub-channel. It is unnecessary to perform channel tracking on all subchannels of the multicarrier system at the same time in case of slowly varying channels, and performing channel tracking on the sub-channels one by one or in groups is sufficient to satisfy a channel varying speed.

Figure 4:
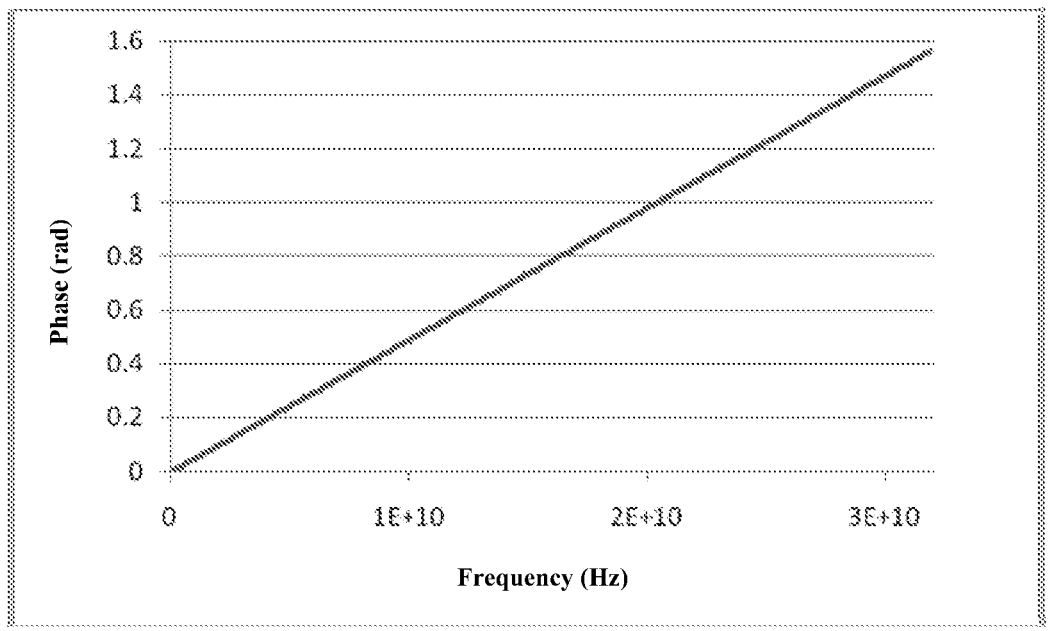
FIG. 4 is a schematic diagram of a relationship between a phase error and a sub-channel central frequency at certain time delay in a multicarrier system.

FIG. 4 is a schematic diagram of a relationship between a phase error and a sub-channel central frequency at certain time delay in a multicarrier system. Assuming that a residual time error is T, a central frequency of a k-th subcarrier is $F_k$ and a sampling frequency of the system is $F_s$, a phase error of the k-th subcarrier is:

$$Ph_k = \frac{2\pi F_k}{F_s} T. \quad (1)$$

It can be seen from formula (1) that the higher of the central frequency of the sub-channel, the larger of the phase error at the same time delay. In performing the phase tracking, the error is embodied as an iteration step length becoming small and a convergence speed becoming slow. Hence, the tracking speed of the high-frequency sub-channel in the structure of FIG. 2 is relatively slow. In the scenario where attenuation is relatively severe at a high frequency of a channel, influence of such an effect on the performance of the system is not obvious.

In this embodiment, the phase rotating unit 305 is a selective phase rotating module, which calculates the phase offset of the designated sub-channel according to a time delay signal and formula (1), and performs phase rotation separately on this channel. And the channel tracking unit 204 tracks the designated channel according to the error signal obtained according to a decision result of the deciding unit 203 and the signal on which phase rotation is performed by the phase rotating unit 305, and outputs a new equalizer coefficient of the designated sub-channel. Hence, tracking of all sub-channels is achieved by changing the designated channels.

Figure 5:
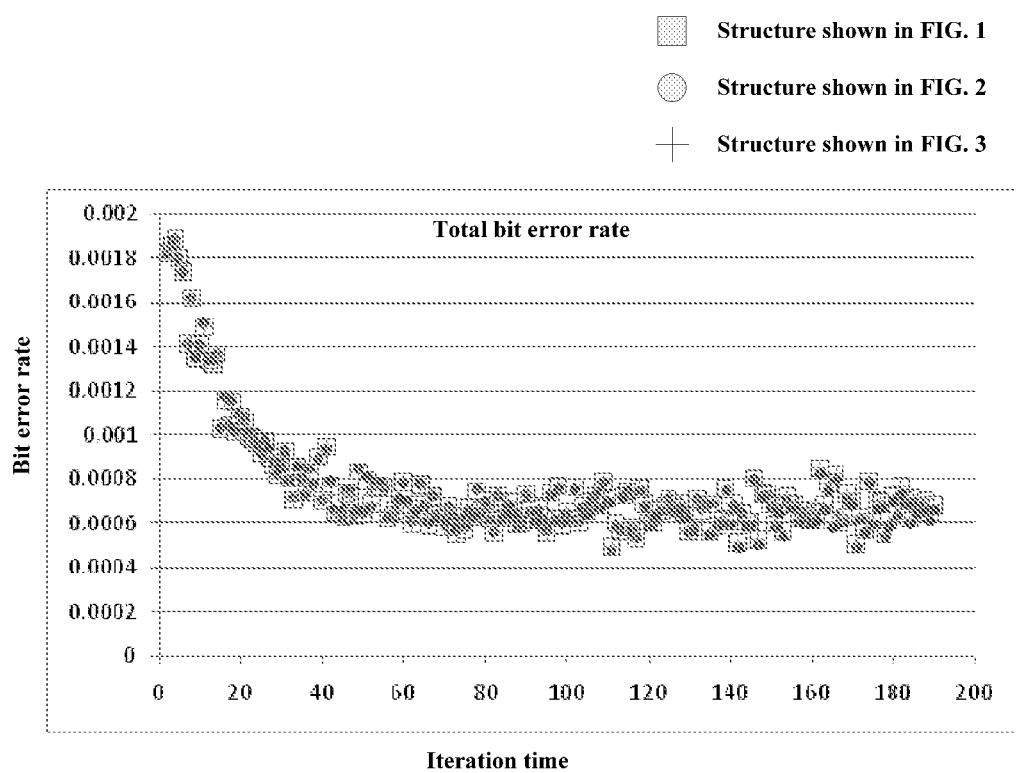
FIG. 5 is a schematic diagram of comparison of results of channel tracking of Embodiment 1 of the present disclosure.

FIG. 5 is a schematic diagram of comparison of results of channel tracking of the embodiment of the present disclosure, in which results of channel tracking in a typical multicarrier system by using the general structure shown in FIG. 1 and the structures shown in FIGS. 2 and 3 are shown; a change of a channel is a step change of channel attenuation.

As shown in FIG. 5, the result of the channel tracking by using the structure shown in FIG. 2 is very close to the conventional result of the channel tracking by using the general structure shown in FIG. 1, and the result of the channel tracking by using the structure shown in FIG. 3 is completely consistent the conventional result of the channel tracking by using the general structure shown in FIG. 1. It can be seen from FIG. 5 that performance of the channel equalization and tracking apparatus shown in FIG. 2 and the channel equalization and tracking apparatus shown in FIG. 3 is not degraded due to lowering of the complexity.

It can be seen from the above embodiment that by using one time of multiplication to perform phase compensation and frequency-domain equalization on the Fourier transformed signal and tracking a channel by using an error signal obtained by using the result of decision and a signal without being phase rotated, not only performance of the system is not affected, but also complexity and hardware demands of the whole system are lowered.

Embodiment 2

An embodiment of the present disclosure provides a channel equalization and tracking method, corresponding to the channel equalization and tracking apparatus of Embodiment 1, with identical contents being not going to be described any further.

Figure 6:
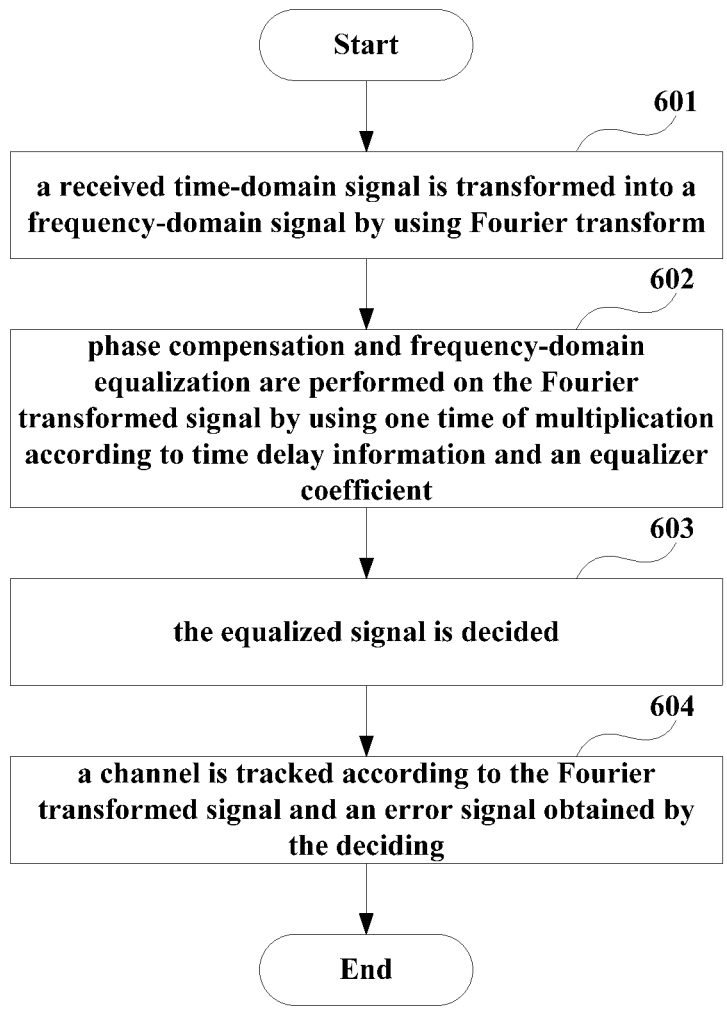
FIG. 6 is a flowchart of the channel equalization and tracking method of Embodiment 2 of the present disclosure.

FIG. 6 is a flowchart of the channel equalization and tracking method of the embodiment of the present disclosure. As shown in FIG. 6, the channel equalization and tracking method includes:
- step 601: a received time-domain signal is transformed into a frequency-domain signal by using Fourier transform;
- step 602: phase compensation and frequency-domain equalization are performed on the Fourier transformed signal by using one time of multiplication according to time delay information and an equalizer coefficient;
- step 603: the error signal is decided based on the equalized signal; and
- step 604: a channel is tracked according to the Fourier transformed signal and an error signal obtained by the deciding.

Figure 7:
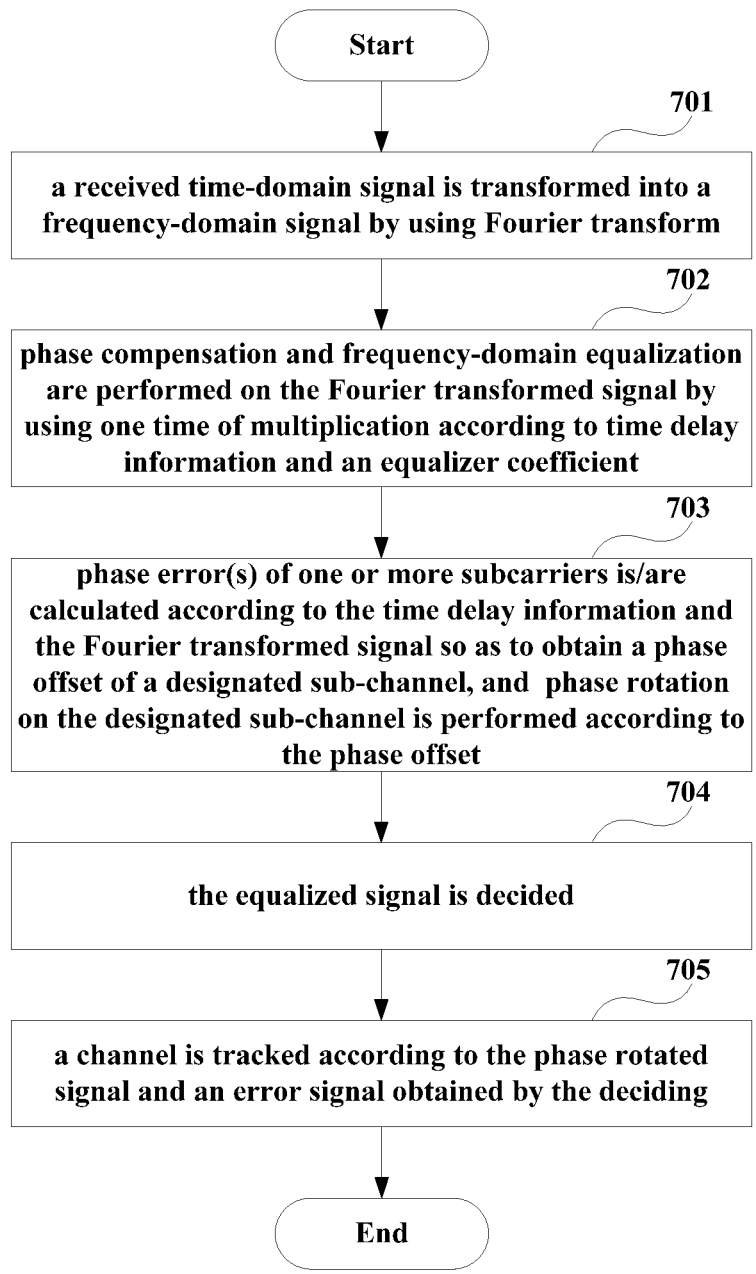
FIG. 7 is another flowchart of the channel equalization and tracking method of Embodiment 2 of the present disclosure.

FIG. 7 is another flowchart of the channel equalization and tracking method of the embodiment of the present disclosure. As shown in FIG. 7, the channel equalization and tracking method includes:
- step 701: a received time-domain signal is transformed into a frequency-domain signal by using Fourier transform;
- step 702: phase compensation and frequency-domain equalization are performed on the Fourier transformed signal by using one time of multiplication according to time delay information and an equalizer coefficient;
- step 703: phase error(s) of one or more subcarriers is/are calculated according to the time delay information and the Fourier transformed signal so as to obtain a phase offset of a designated sub-channel, and phase rotation on the designated sub-channel is performed according to the phase offset;
- step 704: the error signal is decided based on the equalized signal; and step 705: a channel is tracked according to the phase rotated signal and an error signal obtained by the deciding.

In this embodiment, the phase error(s) of one or more subcarriers is/are calculated by using the formula as below:

$$Ph_k = \frac{2\pi F_k}{F_s}T;$$

where, T is a residual time error, $F_k$ is a central frequency of a k-th subcarrier, $F_s$ is a system sampling frequency, and $Ph_k$ is a phase error of the k-th subcarrier.

It can be seen from the above embodiment that by using one time of multiplication to perform phase compensation and frequency-domain equalization on the Fourier transformed signal and tracking a channel by using an error signal obtained by using the result of decision and a signal without being phase rotated, not only performance of the system is not affected, but also complexity and hardware demands of the whole system are lowered.

Embodiment 3

An embodiment of the present disclosure provides a receiver, including the channel equalization and tracking apparatus 200 or 300 as described in Embodiment 1.

Figure 8:
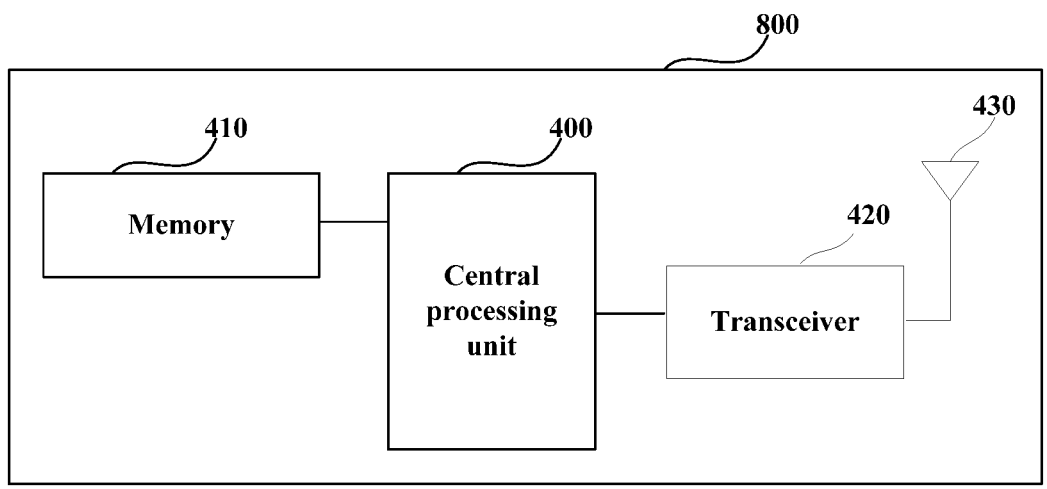
FIG. 8 is a schematic diagram of a structure of the receiver of Embodiment 3 of the present disclosure.

FIG. 8 is a schematic diagram of a structure of the receiver of the embodiment of the present disclosure. As shown in FIG. 8, the receiver 800 may include a central processing unit (CPU) 400 and a memory 410, the memory 410 being coupled to the central processing unit 400. The memory 410 may store various data, and furthermore, it may store programs for information processing, and execute the programs under control of the central processing unit 400.

In an implementation, the functions of the channel equalization and tracking apparatus may be integrated into the central processing unit 400. The central processing unit 400 may be configured to carry out the channel equalization and tracking method as described in Embodiment 2.

In another implementation, the channel equalization and tracking apparatus and the central processing unit 400 may be configured separately. For example, the channel equalization and tracking apparatus may be configured as a chip connected to the central processing unit 400, with its functions being realized under control of the central processing unit.

Furthermore, as shown in FIG. 8, the receiver 800 may further include a transceiver 420, and an antenna 430, etc.; functions of the above components are similar to those in the relevant art, and shall not be described herein any further. It should be noted that the receiver 800 does not necessarily include all the parts shown in FIG. 8. And furthermore, the receiver 800 may include components not shown in FIG. 8, and the relevant art may be referred to.

An embodiment of the present disclosure provides a computer-readable program, wherein when the program is executed in a receiver, the program enables a computer to carry out the channel equalization and tracking method as described in Embodiment 2 in the receiver.

An embodiment of the present disclosure further provides a storage medium in which a computer-readable program is stored, the computer-readable program enables a computer to carry out the channel equalization and tracking method as described in Embodiment 2 in a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A channel equalization and tracking apparatus, comprising:
   a Fourier transforming unit configured to transform a received time-domain signal into a frequency-domain signal;
   a compensating and equalizing unit configured to perform phase compensation and frequency-domain equalization on the frequency domain signal outputted by the Fourier transforming unit by using one time of multiplication according to time delay information and an equalizer coefficient;
   a deciding unit configured to decide an equalized signal; and
   a channel tracking unit configured to track a channel according to the frequency domain signal outputted by the Fourier transforming unit and an error signal obtained by the deciding unit using the equalized signal.

2. The channel equalization and tracking apparatus according to claim 1, wherein the apparatus further comprises:
   a phase rotating unit configured to calculate phase error(s) of one or more subcarriers according to the time delay information and the frequency-domain signal outputted by the Fourier transforming unit to obtain a phase offset of a designated sub-channel, and perform phase rotation on the designated sub-channel according to the phase offset;
   and the channel tracking unit is further configured to track the channel according to a phase rotated signal outputted by the phase rotating unit and the error signal obtained by the deciding unit.

3. The channel equalization and tracking apparatus according to claim 2, wherein the phase rotating unit is configured to calculate the phase error(s) of one or more subcarriers using:

$$Ph_k = \frac{2\pi F_k}{F_s}T;$$

where, T is a residual time error, Fk is a central frequency of a k-th subcarrier, Fs is a system sampling frequency, and Phk is a phase error of the k-th subcarrier.

4. A channel equalization and tracking method, comprising:
transforming a received time-domain signal into a frequency-domain signal by using a Fourier transform;
performing phase compensation and frequency-domain equalization on a Fourier transformed frequency domain signal by using one time of multiplication according to time delay information and an equalizer coefficient;
deciding an equalized signal; and
tracking a channel according to the Fourier transformed signal and an error signal obtained by the deciding using the equalized signal.

5. The channel equalization and tracking method according to claim 4, wherein the method comprises:
calculating phase error(s) of one or more subcarriers according to the time delay information and the Fourier transformed frequency domain signal to obtain a phase offset of a designated sub-channel, and performing phase rotation on the designated sub-channel according to the phase offset; and
tracking the channel according to a phase rotated signal and the error signal obtained by the deciding.

6. The channel equalization and tracking method according to claim 5, wherein the phase error(s) of one or more subcarriers being calculated using:

$$Ph_k = \frac{2\pi F_k}{F_s} T;$$

where, T is a residual time error, Fk is a central frequency of a k-th subcarrier, Fs is a system sampling frequency, and Phk is a phase error of the k-th subcarrier.

7. A receiver, comprising the channel equalization and tracking apparatus as claimed in claim 1.

8. A channel equalization and tracking apparatus, comprising:
a computer comprising:
a Fourier transform unit configured to transform a received time-domain signal into a frequency-domain signal;
a compensating and equalizing unit configured to perform phase compensation and frequency-domain equalization on the frequency domain signal using a multiplication of time delay information and an equalizer coefficient to produce a compensated and equalized frequency domain signal;
a deciding unit configured to obtain an error signal using the compensated and equalized frequency domain signal; and
a channel tracking unit configured to track a channel using the compensated and equalized frequency domain signal and the error signal.

9. A non-transitory computer readable storage medium storing a channel equalization and tracking method, the method comprising:
transforming a received time-domain signal into a frequency-domain signal using a Fourier transform;
performing phase compensation and frequency-domain equalization on the frequency domain signal by using a multiplication of time delay information and an equalizer coefficient to produce a compensated and equalized frequency domain signal;
deciding an error signal using the compensated and equalized frequency domain signal; and
tracking a channel using the compensated and equalized frequency domain signal and the error signal.

* * * * *